(12) United States Patent
Lauk

(10) Patent No.: US 8,410,651 B2
(45) Date of Patent: Apr. 2, 2013

(54) DRIVING DEVICE FOR VEHICLE UNITS

(75) Inventor: Detlef Lauk, Renchen (DE)

(73) Assignee: Robert Bosch GmbH, Stuttgart (DE)

(*) Notice: Subject to any disclaimer, the term of this patent is extended or adjusted under 35 U.S.C. 154(b) by 97 days.

(21) Appl. No.: 12/743,404

(22) PCT Filed: Apr. 22, 2009

(86) PCT No.: PCT/EP2009/054832
§ 371 (c)(1),
(2), (4) Date: May 18, 2010

(87) PCT Pub. No.: WO2009/130249
PCT Pub. Date: Oct. 29, 2009

(65) Prior Publication Data
US 2011/0030162 A1    Feb. 10, 2011

(30) Foreign Application Priority Data
Apr. 24, 2008   (DE) .................. 10 2008 001 359

(51) Int. Cl.
*H02K 11/02*    (2006.01)
(52) U.S. Cl. .................... 310/154.08; 310/239
(58) Field of Classification Search .......... 310/83, 310/89, 154.01, 154.08, 233, 238, 239
See application file for complete search history.

(56) References Cited

U.S. PATENT DOCUMENTS

| | | | | |
|---|---|---|---|---|
| 4,398,135 A | * | 8/1983 | Busch et al. | 318/443 |
| 5,184,039 A | * | 2/1993 | Kraft | 310/89 |
| 5,650,676 A | * | 7/1997 | Blumenberg | 310/88 |
| 6,201,326 B1 | | 3/2001 | Klappenbach et al. | |
| 6,515,399 B1 | * | 2/2003 | Lauf et al. | 310/239 |
| 6,653,754 B2 | * | 11/2003 | Uchida et al. | 310/51 |
| 6,700,291 B2 | * | 3/2004 | Uchida et al. | 310/239 |
| 6,822,367 B1 | * | 11/2004 | Uchida et al. | 310/242 |
| 6,851,509 B2 | * | 2/2005 | Hayakawa et al. | 180/444 |
| 6,940,194 B1 | * | 9/2005 | Lauk | 310/90 |
| 7,554,235 B2 | | 6/2009 | Kano et al. | |
| 2007/0046121 A1 | * | 3/2007 | Miura et al. | 310/154.08 |
| 2007/0164621 A1 | * | 7/2007 | Kano et al. | 310/71 |

FOREIGN PATENT DOCUMENTS

GB    2140218 A    11/1984

OTHER PUBLICATIONS

PCT/EP2009/054832 International Search Report.

* cited by examiner

*Primary Examiner* — Dang Le
(74) *Attorney, Agent, or Firm* — Michael Best & Friedrich LLP

(57) ABSTRACT

Disclosed is a driving device for a vehicle unit. Said driving device (10) comprises a pole housing (12) in which at least a portion of the driving motor (14) is arranged as well as a transmission housing (16) in which a transmission device (18) is arranged that can be driven by the driving motor (14). Said driving device (10) is characterized in that at least a portion of or essentially the entire pole housing (12) and/or transmission housing (16) has/have a metal shield.

15 Claims, 4 Drawing Sheets

DRIVING DEVICE FOR VEHICLE UNITS

BACKGROUND OF THE INVENTION

The invention relates to a driving device for vehicle units, for example a front or rear windshield wiper device.

In electric motors known from the prior art, a brush holder is generally accommodated in a pole housing of the electric motor. In other embodiments, the brush holder is provided in the gear mechanism housing in a manner more or less unshielded by metal. In both cases, the installation space around the brush holder remains unused and also contributes to increasing the size of the motor.

Therefore, a driving device for a vehicle unit is provided according to the invention, in which driving device at least a portion of a pole housing and/or of a gear mechanism housing has a metal shield for shielding at least a portion of the drive motor, for example the brush holder and the brush elements of said drive motor.

SUMMARY OF THE INVENTION

According to the invention, the driving device in this case has the advantage that the drive motor is at least partly shielded from external interference, for example radio frequencies and the like. This shielding is achieved by shielding the pole housing or gear mechanism housing metal. Increased customer demands with respect to radiation can be met as a result. This is not possible with the above-described unshielded drive motors known to date.

In a preferred embodiment of the invention, the drive motor is, for example, an electric motor which has a brush holder and brush elements. In order to better utilize the installation space in the driving device, the brush holder can additionally be provided with one or more electronic components, including, for example, inductors, capacitors, relays etc., to name just a few examples of such electrical components.

In a further embodiment according to the invention, the brush holder and the brush elements are arranged in a receptacle in the gear mechanism housing. In this case, the receptacle is in the form of a metal shield. In this case, the receptacle can consist of or contain metal or a metal alloy.

In another embodiment according to the invention, the upper face and/or lower face of the receptacle can be covered by a covering element. The covering element is, for example, a metal covering element or consists of or at least contains metal or a metal alloy. In addition, the upper face and/or lower face of the covering element can be provided with at least one or more electronic components, for example a feed-through capacitor (Duko [abbreviation in German]) etc., to name just one example. As a result, the installation space in the driving device can be additionally utilized.

According to a further embodiment according to the invention, the gear mechanism housing can be covered by a gear mechanism cover, it being possible for the gear mechanism cover to be used, for example, for shielding purposes since it consists of or contains metal or a metal alloy. However, in principle, the gear mechanism cover can also be produced from or at least contain plastic.

In a further embodiment according to the invention, the gear mechanism cover has a receptacle for accommodating a printed circuit board. In this case, the printed circuit board can be arranged, for example, at least partially above the brush holder and the brush elements of said brush holder. This has the advantage that the installation space in the driving device can be better utilized. In another embodiment, the above-described covering element can be arranged between the printed circuit board and the brush holder and the brush elements of said brush holder. This has the advantage that the covering element, for example consisting of metal or a metal alloy, can additionally serve as a cooling face and can prevent undesired heating of the printed circuit board.

In another embodiment according to the invention, the gear mechanism cover is provided with at least one plug connection. This has the advantage that space can additionally be saved and the driving device can be designed in a compact manner.

According to a further embodiment of the invention, the gear mechanism housing has a receptacle for the gear mechanism device. In this case, the receptacle and/or substantially the entire gear mechanism housing can consist of or contain metal or a metal alloy. For example, the gear mechanism housing with the receptacles for the gear mechanism device, and also the brush holder and the brush elements of said brush holder, can, for example, be in the form of cast parts.

In another embodiment according to the invention, the brush holder and the brush elements are arranged in the pole housing, for example in a stator casing of the drive motor. This stator casing, for example comprising sheet metal, likewise acts as a metal shield.

According to the invention, the driving device can drive, for example, a front windshield wiper device and/or a rear windscreen wiper device as the vehicle unit. However, the invention is not restricted to this, but rather can also be used for other vehicle units.

BRIEF DESCRIPTION OF THE DRAWINGS

Exemplary embodiments of the invention will be explained in greater detail below with reference to the schematic figures in which.

DETAILED SUMMARY

Identical or similar parts below are provided with the same reference numbers in the figures.

Figure 1:
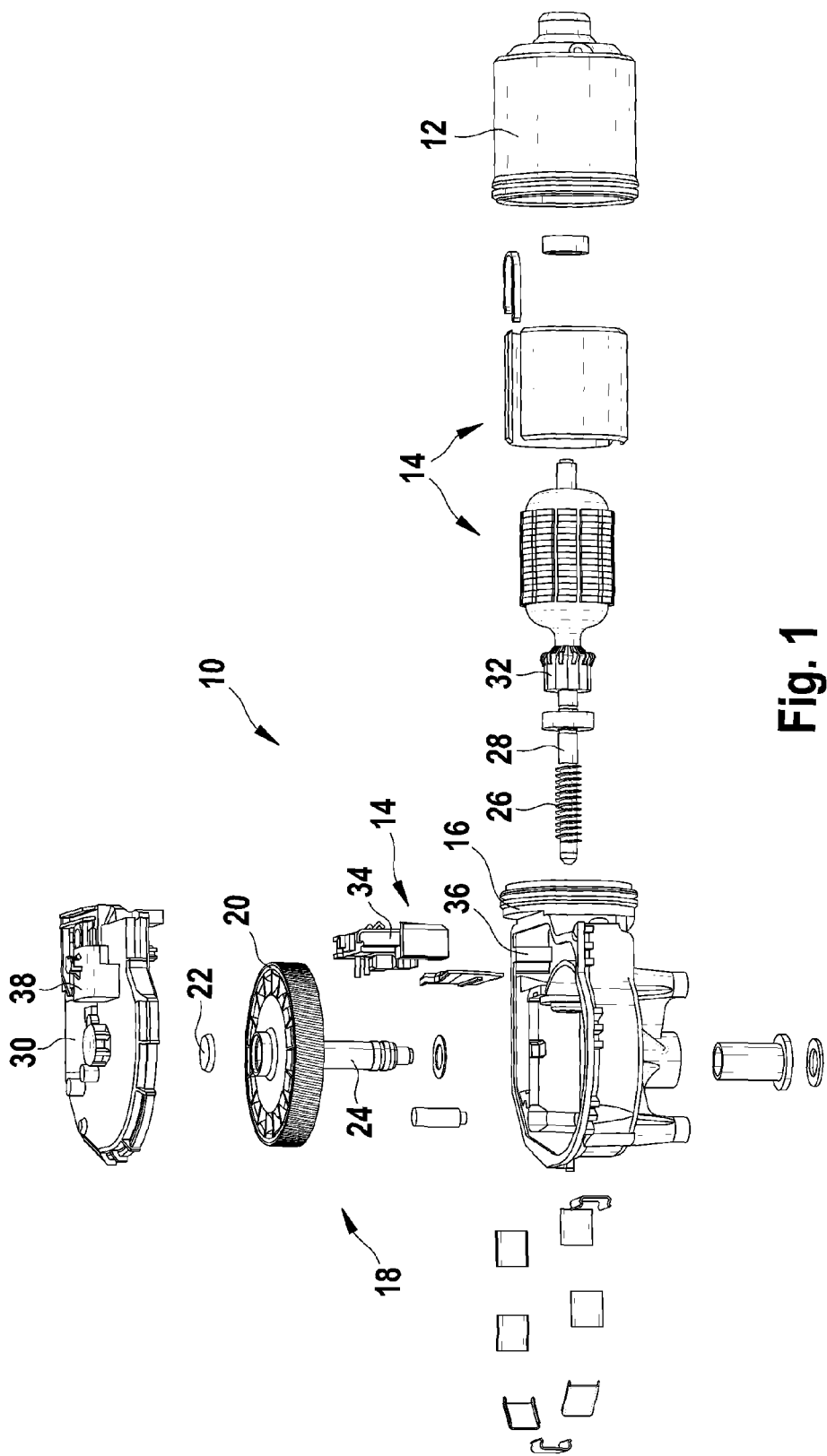
FIG. 1 shows a schematic exploded illustration of a driving device according to a first embodiment of the invention.

FIG. 1 shows an exploded illustration of a driving device according to a first embodiment of the invention. In this case, the driving device 10 has a pole housing 12 with a drive motor 14, for example an electric motor. A gear mechanism housing 16 is fitted to an end face of the pole housing 12. In this case, a gear mechanism device 18 which is driven by means of the drive motor 14 is arranged in the gear mechanism housing 16. In the present case, as shown in FIG. 1, the gear mechanism device 18 has a gear wheel 20 with a transmitter magnet 22 and a drive shaft 24. In this case, the gear wheel 20 engages with a worm gear 26 which is arranged on an armature shaft 28 of the electric motor 14. The drive shaft 24 of the gear wheel 20 can be connected to a corresponding vehicle unit (not illustrated) in order to drive said vehicle unit. Such a vehicle unit is, for example, a wiper device in a passenger car or heavy goods vehicle. The gear mechanism housing 16 itself is closed by a gear mechanism cover 30.

The drive motor 14, in this case the electric motor, is arranged in the pole housing 12 of the driving device 10. A commutator 32 is located on the armature shaft 28 of the electric motor 14. In the present example as shown in FIG. 1, a brush holder 34 and the brush elements of said brush holder, for example, carbon brushes, are arranged in a housing section or a receptacle 36 of the gear mechanism housing 16 and interact with the commutator 32 in the installed state.

According to the first embodiment of the invention, at least one plug outlet 38 or socket outlet is provided in the space above the brush holder 34 and the brush elements of said brush holder. In this case, the plug outlet 38 is arranged in the gear mechanism cover 30, above the brush holder 34 and the brush elements.

Figure 2:
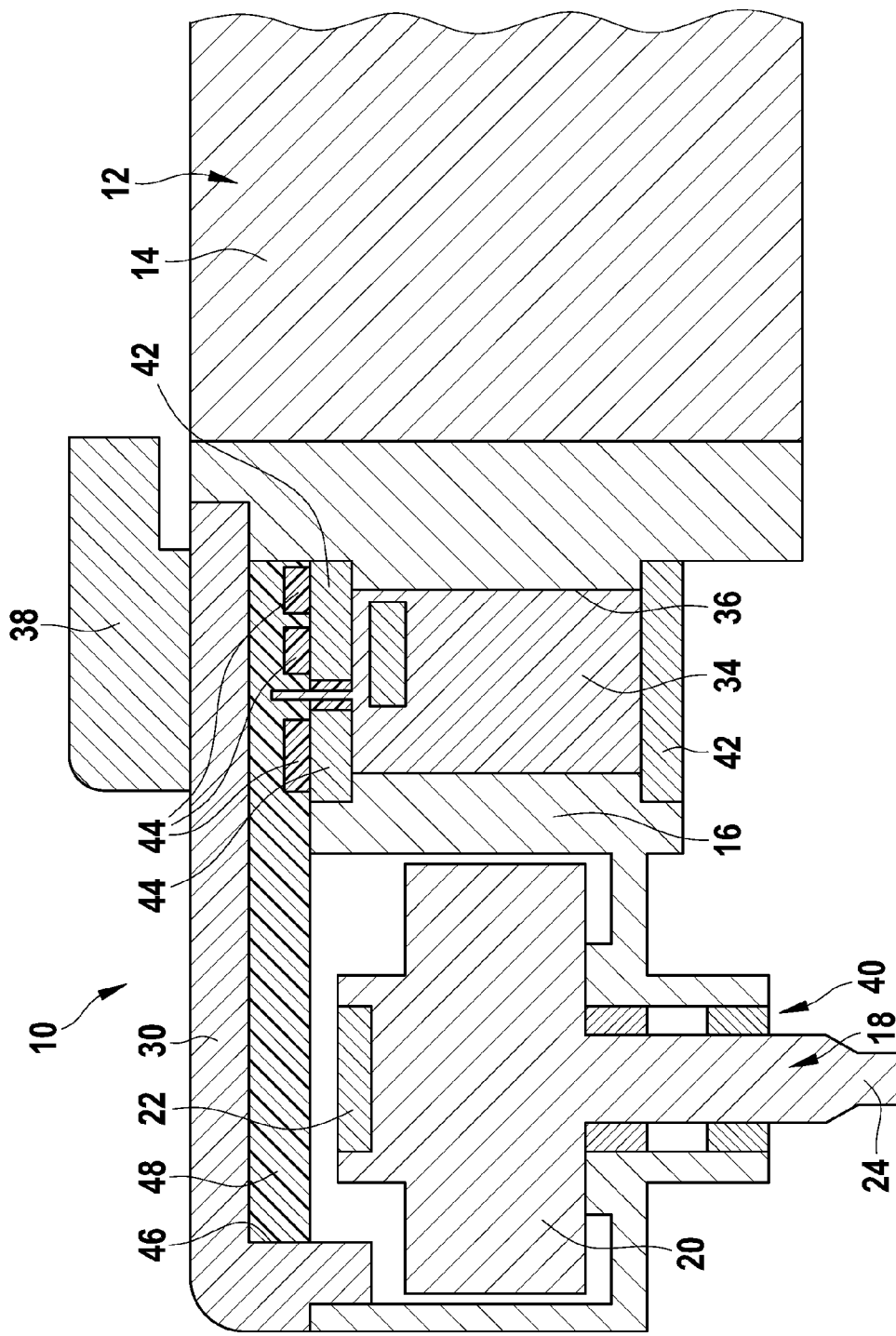
FIG. 2 shows a schematic sectional view through a driving device according to a second embodiment of the invention.

FIG. 2 illustrates a sectional view through a further, second embodiment of the driving device 10 according to the invention. The driving device 10 likewise has a pole housing 12 in which a drive motor 14, for example an electric motor, is arranged. The pole housing 12 is again fitted to a flange section of a gear mechanism housing 16. A gear mechanism device 18 is arranged in the gear mechanism housing 16. In the present case, as shown in FIG. 2, the gear mechanism device 18 has a gear wheel 20 with a magnet element or transmitter magnet 22. Further devices, for example a wiper system, such as a front or rear wiper system of a vehicle, can be driven by means of a drive shaft 24 which is connected to the gear wheel 20. The drive shaft 24 is mounted, such that it can rotate, in the gear mechanism housing 16 by means of a bearing arrangement 40, for example comprising two roller bearings. The gear mechanism device 18 or the gear wheel 20 is driven by means of an armature shaft 28 of the drive motor 14. A brush holder 34, together with the brush elements of said brush holder, is arranged in the gear mechanism housing 16, next to the gear mechanism device 18. In this case, the brush elements interact with a commutator (not illustrated) of the drive motor 14. The gear mechanism housing 16 consists of metal or a metal alloy and can be produced, for example, in the form of a metal casting. For the purpose of accommodating the brush holder 34 and the brush elements of said brush holder, the gear mechanism housing 16 has a corresponding receptacle 36 or recess. In this case, the gear mechanism housing 16 can be designed to be open at the upper face and/or lower face in the region of the receptacle 36 for the brush holder 34 and the brush elements of said brush holder, for the purpose of inserting these elements. This open region can be formed, for example, such that it can be covered in each case by a covering element 42, in this case a covering plate, for example comprising metal or a metal alloy.

As shown in FIG. 2, the receptacle 36 for the brush holder 34 and the brush elements is open at the upper face and/or lower face, it being possible for the upper face and lower face to be closed in each case by a covering plate 42 comprising metal or a metal alloy. A kind of Faraday cage for the brush arrangement can be provided by virtue of the metal gear mechanism housing 16 and the metal receptacle 36 for the brush elements and the holder 34 of said brush elements, and also by the provision of metal covering plates 42. Furthermore, for example, at least one or more electrical components 44, for example interference-suppression elements, can be provided in the upper and/or lower covering plate or plates 42. The interference-suppression element 44 used can be, for example, a feed-through capacitor (Duko [abbreviation in German]). Furthermore, the brush holder 34 can be provided with at least one or more so-called EMC components, and selectively with at least one additional plug connection or socket connection. The EMC components provided can be, for example, inductors, capacitors etc.

The gear mechanism housing 16 is closed by a gear mechanism cover 30, as shown in FIG. 2. In this case, a receptacle 46 for a printed circuit board 48 can be provided on the inner face of the gear mechanism cover 30. In this case, the printed circuit board 48 can have, for example, the control electronics or parts of the control electronics for the drive motor 14.

In addition to or instead of the control electronics, electrical components 44, for example capacitors, coils, relays and transistors, for example power transistors, can be arranged on the printed circuit board 48, as can sliding contact elements or optoelectronic components etc. The present invention is not restricted to said elements 44, including the electronics for the drive motor 14, but rather the elements constitute only examples which can be provided on the printed circuit board 48.

As shown in FIG. 2, the gear mechanism cover 30 can also have a plug connection 38 or socket connection on its outer face. The gear mechanism cover 30 can likewise consist of or contain metal or a metal alloy. However, in principle, the gear mechanism cover 30 can also be produced from plastic or at least parts of said gear mechanism cover can be produced from plastic.

Figure 3:
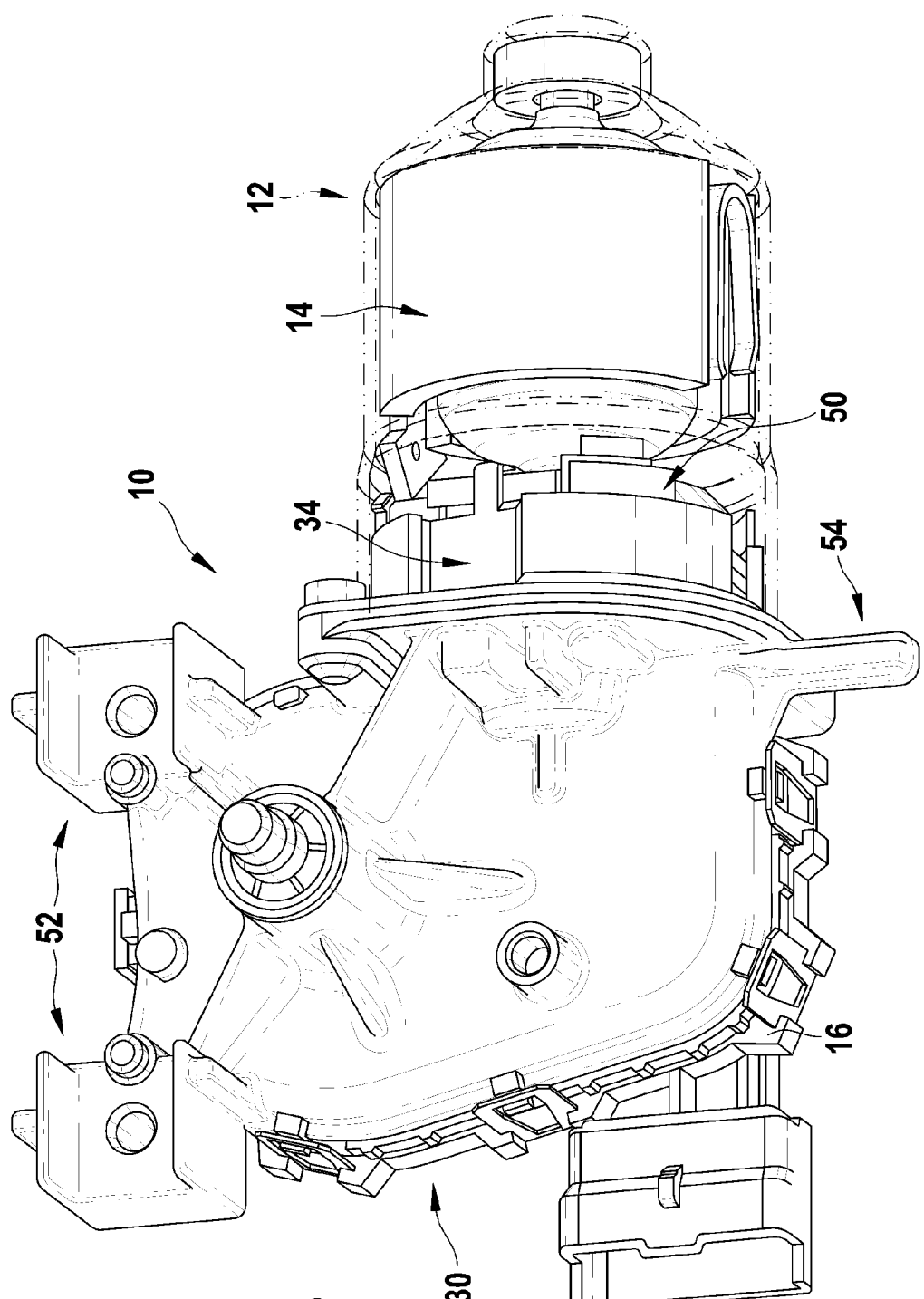
FIG. 3 shows a schematic perspective view of a driving device according to a third embodiment of the invention.

FIG. 3 illustrates a third embodiment of a driving device 10 according to the invention. In this case, the pole housing 12 of the driving device 10 is illustrated as being transparent. A drive motor 14, in this case an electric motor, is arranged in the interior of the pole housing 12. Furthermore, a brush holder 34 and the brush elements of said brush holder are arranged in the pole housing 12. In the process, a frame or casing 50 of a stator forms a Faraday cage around the brush holder 34 and the brush elements of said brush holder. In this case, the casing 50 comprises metal or a metal alloy, or comprises sheet metal, and shields the brush holder 34 and the brush holder elements of said brush holder from the external environment.

As shown in FIG. 3, the pole housing 12 is fitted to a flange of a gear mechanism housing 16, for example by means of screws. A gear mechanism device (not illustrated) is arranged in the gear mechanism housing 16, as was described above with reference to FIGS. 1 and 2. The gear mechanism device, which has, for example, a gear wheel, a transmitter magnet and a drive shaft, is driven by means of an armature shaft of the drive motor 14. Furthermore, the gear mechanism housing 16 is closed by means of a gear mechanism cover 30. The gear mechanism cover 30, on its outer face, has, for example, a receptacle 52 in order to be mounted in a vehicle, and also has a retaining point 54 for additionally fixing or positioning the driving device 10 in a vehicle.

Figure 4:
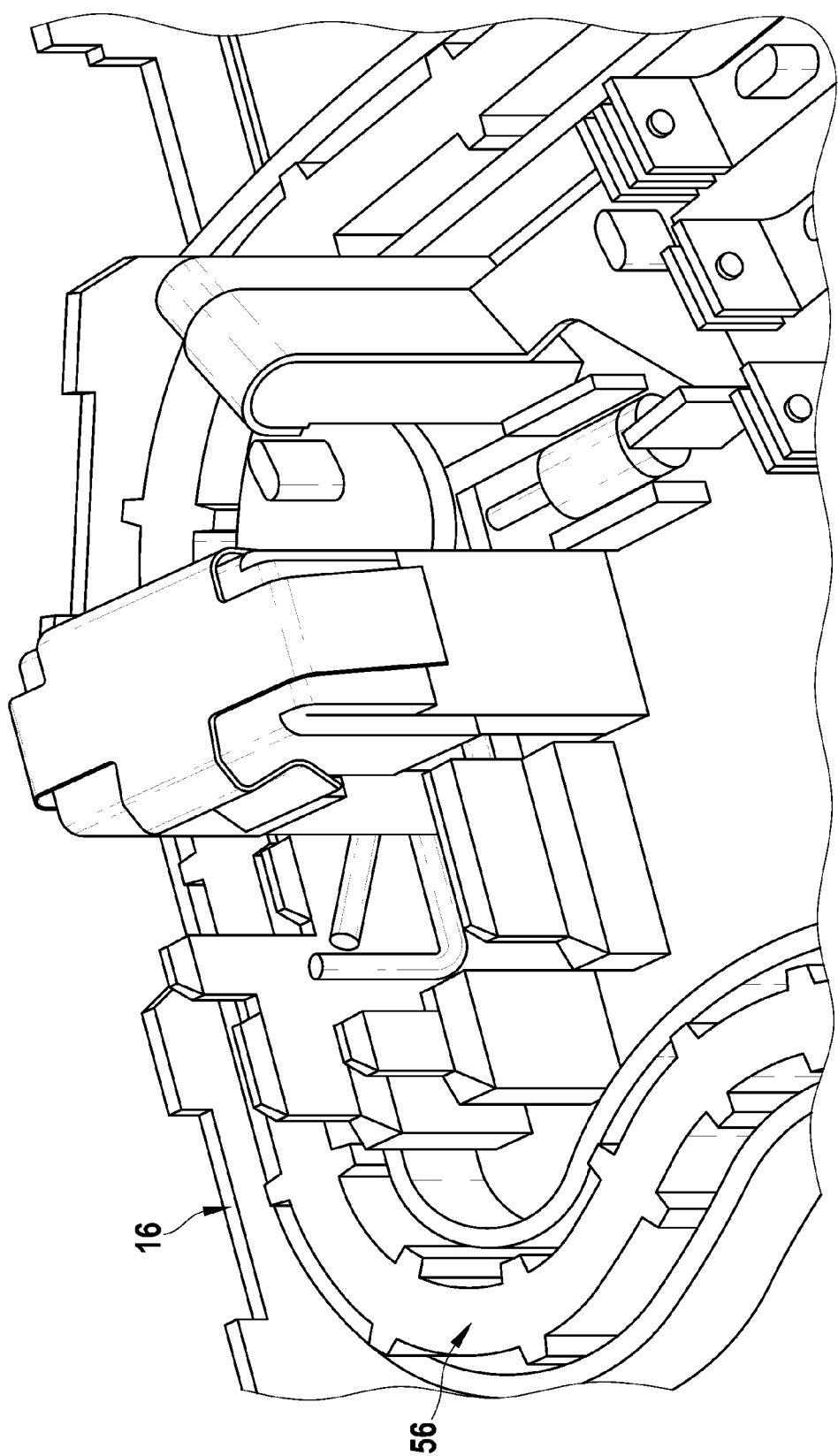
FIG. 4 shows a detail of the gear mechanism housing of the driving device according to FIG. 3, with the gear mechanism cover of the gear mechanism housing removed.

In the detail of the gear mechanism housing 16 as shown in FIG. 4, the gear mechanism cover is removed. A rubber seal element 56 is fitted or placed on the gear mechanism housing 16 in order to protect the gear mechanism housing 16 against contamination. On account of the brush holder and the brush elements of said brush holder being arranged in the pole housing and not in the gear mechanism housing 16, as was described above with reference to FIGS. 1 and 2, the gear mechanism housing 16 can be designed to be more compact.

The invention, as was identified above with reference to FIGS. 1-3, provides, inter alia, for the installation space around the brush holder to additionally be used in a functional manner, so that the overall design of the driving device or of the motor can be reduced in size. To this end, the installation space around the brush holder can be used, according to the invention, to mount and cool a printed circuit board and/or as a direct outlet for a plug, as was described with reference to FIGS. 1 and 2. Furthermore, a simple metal covering element or a metal covering plate can be used according to the invention in order to shield the brush holder region in the manner of a kind of Faraday cage.

In this case, the advantage of the invention is that the installation space around the brush holder can be utilized since, for example, a printed circuit board is positioned at least partly or completely above said brush holder. In this case, a cooling face for the printed circuit board can be provided by way of an additional metal covering plate. As an alternative, it is possible, for example in motors with substantially no electronics, to also position a plug outlet directly in the installation space around the brush holder. As a result, the installation space can be reduced overall and therefore the driving device can be reduced in size and designed to be more compact.

A further advantage of the invention is that the brush holder region is shielded by metal, and therefore a kind of Faraday cage is formed. As a result, increased customer demands can be met since the brush holder region is shielded against radiation, for example from radio frequencies or digital radio frequencies. Another advantage of the invention is the short connection paths of the brush elements or carbon brushes, the interference-suppression elements and the printed circuit board or the plug. By way of example, feed-through capacitors can be integrated in the respective covering element as interference-suppression elements. As a result, the installation space can be better utilized and therefore the installation space can be reduced in size overall. Costs can also be reduced. The above-described embodiments, in particular individual features of said embodiments, can also be combined with one another.

The invention claimed is:

1. A driving device for a vehicle unit, with the driving device (10) having a pole housing (12) in which at least a portion of the drive motor (14) is arranged, and a gear mechanism housing (16) in which a gear mechanism device (18) is arranged, it being possible for said gear mechanism device to be driven by means of the drive motor (14), characterized in that at least a portion of the pole housing (12) and/or gear mechanism housing (16) has a metal shield, characterized in that the drive motor (14) is an electric motor which has a brush holder (34) and brush elements, and characterized in that the brush holder (34) and the brush elements are supported by a receptacle (36) in the gear mechanism housing (16), with the receptacle (36) being in the form of a metal shield, characterized in that the gear mechanism housing (16) is covered by a gear mechanism cover (30), with the gear mechanism cover (30) containing metal, a metal alloy or plastic, characterized in that the gear mechanism cover (30) has a receptacle (46) for accommodating a printed circuit board (48), wherein the printed circuit board (48) extends at least partially over the brush holder (34) and the brush elements, and wherein the covering element (42) is arranged between the printed circuit board (48) and the brush holder (34) and the brush elements.

2. The driving device as claimed in claim 1, characterized in that an upper face and/or lower face of the receptacle (36) is covered by a covering element (42) which contains metal or a metal alloy.

3. The driving device as claimed in claim 2, wherein the covering element (42) has at least one or more electronic components (44).

4. The driving device as claimed in claim 3, wherein the electronic components (44) include a feed-through capacitor.

5. The driving device as claimed in claim 1, characterized in that the gear mechanism cover (30) has at least one plug connection and/or socket connection.

6. The driving device as claimed in claim 1, characterized in that the gear mechanism cover (30) has at least one plug connection and/or socket connection.

7. A driving device for a vehicle unit, with the driving device (10) having a pole housing (12) in which at least a portion of the drive motor (14) is arranged, and a gear mechanism housing (16) in which a gear mechanism device (18) is arranged, it being possible for said gear mechanism device to be driven by means of the drive motor (14), characterized in that at least a portion of the pole housing (12) and/or gear mechanism housing (16) has a metal shield separate from the pole housing (12) and the gear mechanism housing (16), characterized in that the gear mechanism cover (30) has a receptacle (46) for accommodating a printed circuit board (48), wherein the drive motor (14) has a brush holder (34) and brush elements, and wherein the printed circuit board (48) extends at least partially over the brush holder (34) and the brush elements, and wherein the covering element (42) is arranged between the printed circuit board (48) and the brush holder (34) and the brush elements.

8. The driving device as claimed in claim 7, characterized in that the gear mechanism housing (16) has a receptacle for the gear mechanism device (18).

9. The driving device as claimed in claim 8, wherein the receptacle and/or substantially the entire gear mechanism housing (16) contains metal or a metal alloy.

10. The driving device as claimed in claim 7, characterized in that the brush holder (34) and the brush elements are arranged in the pole housing (12).

11. The driving device as claimed in claim 10, wherein the brush holder (34) and the brush elements are arranged in a stator casing (50) of the drive motor (14).

12. The driving device as claimed in claim 7, characterized in that the driving device (10) drives a front windshield wiper device and/or a rear windscreen wiper device of the vehicle unit.

13. The driving device as claimed in claim 7, wherein substantially the entire pole housing (12) and/or gear mechanism housing (16) has a metal shield.

14. The driving device as claimed in claim 7, wherein the brush holder (34) has one or more electronic components (44).

15. The driving device as claimed in claim 14, wherein the electronic components (44) include an inductor and/or a capacitor.

* * * * *

UNITED STATES PATENT AND TRADEMARK OFFICE
CERTIFICATE OF CORRECTION

PATENT NO. : 8,410,651 B2  Page 1 of 1
APPLICATION NO. : 12/743404
DATED : April 2, 2013
INVENTOR(S) : Detlef Lauk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 96 days.

Signed and Sealed this
First Day of September, 2015

Michelle K. Lee
*Director of the United States Patent and Trademark Office*